United States Patent
Wuschke

[11] Patent Number: 5,911,430
[45] Date of Patent: Jun. 15, 1999

[54] BICYCLE SEAT POST SHOCK ABSORBER

[76] Inventor: Thomas M. Wuschke, 880 E 4th St., So Boston, Mass. 02127

[21] Appl. No.: 08/974,092

[22] Filed: Nov. 19, 1997

[51] Int. Cl.$^6$ ........................................ B62J 1/02
[52] U.S. Cl. .......................... 280/283; 267/132; 248/601; 297/209
[58] Field of Search .................... 280/283, 220, 280/226.1; 297/195.1, 208, 209, 210, 211, 212; D12/119; 248/599, 600, 601; 267/131, 132, 133, 187, 287

[56] References Cited

U.S. PATENT DOCUMENTS

| D. 288,420 | 2/1987 | Juy | D12/119 |
|---|---|---|---|
| D. 398,269 | 9/1998 | Sennuck et al. | D12/119 |
| 3,481,628 | 12/1969 | Brilando et al. | 280/283 |
| 3,891,236 | 6/1975 | Kuwano et al. | 280/283 |
| 3,989,263 | 11/1976 | Stuck et al. | 280/283 |
| 4,182,508 | 1/1980 | Kallai et al. | 297/209 |
| 4,736,983 | 4/1988 | Furbee | 297/208 |
| 4,997,232 | 3/1991 | Johnsen | 248/601 |
| 5,062,617 | 11/1991 | Campbell | 248/600 |
| 5,094,424 | 3/1992 | Hartway | 280/283 |
| 5,236,169 | 8/1993 | Johnsen | 297/209 |
| 5,236,170 | 8/1993 | Johnsen | 297/209 |
| 5,316,259 | 5/1994 | Pawlykowych et al. | 248/601 |
| 5,324,058 | 6/1994 | Massaro | 280/283 |
| 5,324,174 | 6/1994 | Diotte | 248/601 |
| 5,344,170 | 9/1994 | Ochoa | 280/283 |
| 5,370,351 | 12/1994 | Chen | 280/283 |
| 5,382,039 | 1/1995 | Hawker | 280/283 |

Primary Examiner—Kevin Hurley
Assistant Examiner—William Zimmerli

[57] ABSTRACT

A new bicycle seat post shock absorber for dampening impacts and vibrations directed though the bicycle frame to a bicycle seat. The inventive device includes a cylindrical seat post plunger inserted into the hollow interior of a tubular sleeve member designed for insertion into the lumen of a tubular frame member of a bicycle. A spring member disposed around the seat post plunger functions as a biasing means biases the seat post plunger away from the sleeve member. A movement limiting shoulder included on the seat post plunger limits the amount of insertion of said seat post plunger into the sleeve member.

6 Claims, 2 Drawing Sheets

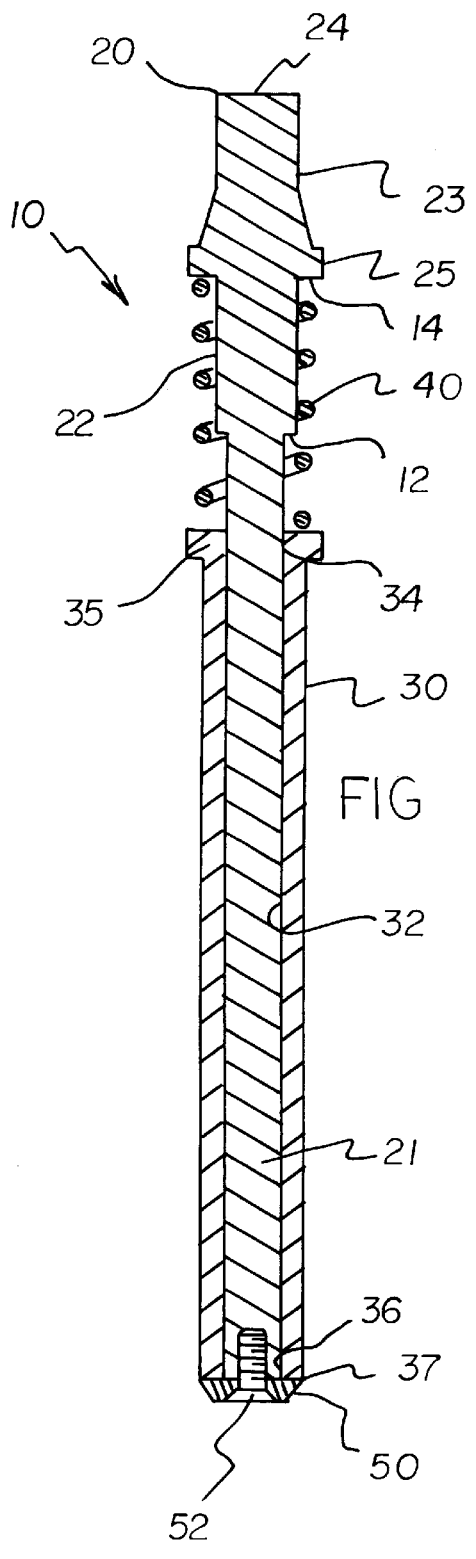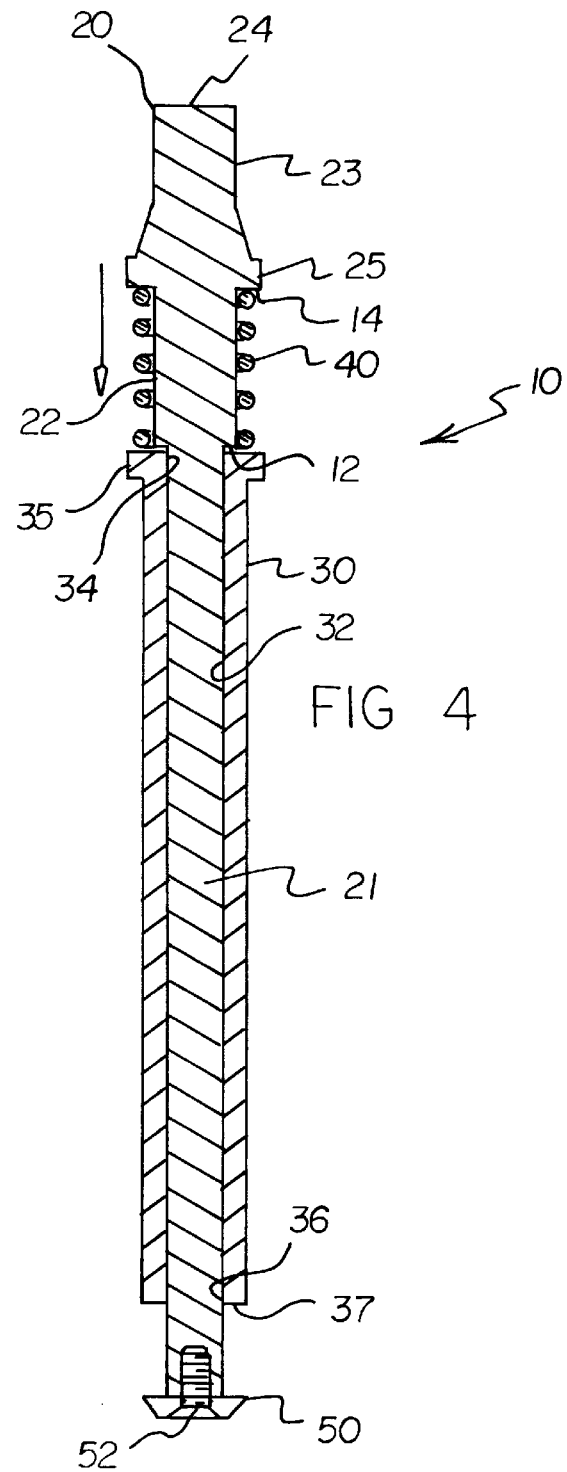

BICYCLE SEAT POST SHOCK ABSORBER

BACKGROUND OF THE INVENTION

1. Field of the Invention

The present invention relates to bicycle seats and more particularly pertains to a new bicycle seat post shock absorber for dampening impacts and vibrations directed though the bicycle frame to a bicycle seat.

2. Description of the Prior Art

The use of bicycle seats is known in the prior art. More specifically, bicycle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle seats include U.S. Pat. No. 3,989,263; U.S. Pat. No. 5,370,351; U.S. Pat. No. 5,382,039; U.S. Pat. No. 5,324,058; U.S. Pat. No. Des. 288,420; and U.S. Pat. No. 5,236,169.

While these devices fulfill their respective, particular objectives and requirements, the aforementioned patents do not disclose a new bicycle seat post shock absorber. The inventive device includes a cylindrical seat post plunger inserted into the hollow interior of a tubular sleeve member designed for insertion into the lumen of a tubular frame member of a bicycle. A spring member disposed around the seat post plunger functions as a biasing means biases the seat post plunger away from the sleeve member. A movement limiting shoulder included on the seat post plunger limits the amount of insertion of said seat post plunger into the sleeve member.

In these respects, the bicycle seat post shock absorber according to the present invention substantially departs from the conventional concepts and designs of the prior art, and in so doing provides an apparatus primarily developed for the purpose of dampening impacts and vibrations directed though the bicycle frame to a bicycle seat.

SUMMARY OF THE INVENTION

In view of the foregoing disadvantages inherent in the known types of bicycle seats now present in the prior art, the present invention provides a new bicycle seat post shock absorber construction wherein the same can be utilized for dampening impacts and vibrations directed though the bicycle frame to a bicycle seat.

The general purpose of the present invention, which will be described subsequently in greater detail, is to provide a new bicycle seat post shock absorber apparatus and method which has many of the advantages of the bicycle seats mentioned heretofore and many novel features that result in a new bicycle seat post shock absorber which is not anticipated, rendered obvious, suggested, or even implied by any of the prior art bicycle seats, either alone or in any combination thereof.

To attain this, the present invention generally comprises a cylindrical seat post plunger inserted into the hollow interior of a tubular sleeve member designed for insertion into the lumen of a tubular frame member of a bicycle. A spring member disposed around the seat post plunger functions as a biasing means biases the seat post plunger away from the sleeve member. A movement limiting shoulder included on the seat post plunger limits the amount of insertion of said seat post plunger into the sleeve member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new bicycle seat post shock absorber apparatus and method which has many of the advantages of the bicycle seats mentioned heretofore and many novel features that result in a new bicycle seat post shock absorber which is not anticipated, rendered obvious, suggested, or even implied by any of the prior art bicycle seats, either alone or in any combination thereof.

It is another object of the present invention to provide a new bicycle seat post shock absorber which may be easily and efficiently manufactured and marketed.

It is a further object of the present invention to provide a new bicycle seat post shock absorber which is of a durable and reliable construction.

An even further object of the present invention is to provide a new bicycle seat post shock absorber which is susceptible of a low cost of manufacture with regard to both materials and labor, and which accordingly is then susceptible of low prices of sale to the consuming public, thereby making such bicycle seat post shock absorber economically available to the buying public.

Still yet another object of the present invention is to provide a new bicycle seat post shock absorber which provides in the apparatuses and methods of the prior art some of the advantages thereof, while simultaneously overcoming some of the disadvantages normally associated therewith.

Still another object of the present invention is to provide a new bicycle seat post shock absorber for dampening impacts and vibrations directed though the bicycle frame to a bicycle seat.

Yet another object of the present invention is to provide a new bicycle seat post shock absorber which includes a cylindrical seat post plunger inserted into the hollow interior of a tubular sleeve member designed for insertion into the lumen of a tubular frame member of a bicycle. A spring member disposed around the seat post plunger functions as a biasing means biases the seat post plunger away from the sleeve member. A movement limiting shoulder included on the seat post plunger limits the amount of insertion of said seat post plunger into the sleeve member.

Still yet another object of the present invention is to provide a new bicycle seat post shock absorber that includes a movement limiting shoulder to limit the insertion range of the seat post plunger within the tubular sleeve member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic sectional view of the present invention.

FIG. 4 is a schematic sectional view of the present invention with the spring member being compressed until the movement limiting shoulder abuts the upper rim of the tubular sleeve member.

DESCRIPTION OF THE PREFERRED EMBODIMENT

Figures 1, 2:
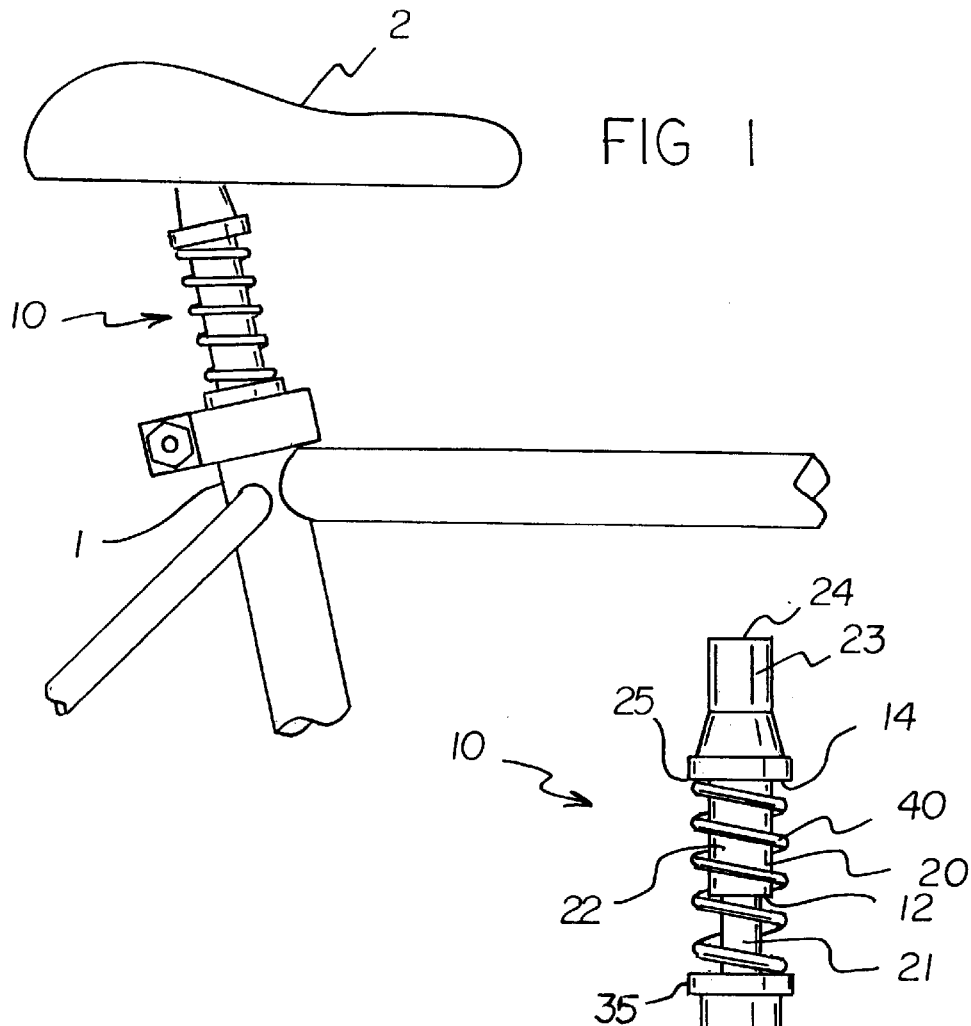
FIG. 1 is a schematic side view of a new bicycle seat post shock absorber mounted to a bicycle according to the present invention.
FIG. 2 is a schematic side view of the present invention.

With reference now to the drawings, and in particular to FIGS. 1 through 4 thereof, a new bicycle seat post shock absorber embodying the principles and concepts of the present invention and generally designated by the reference numeral 10 will be described.

As best illustrated in FIGS. 1 through 4, the bicycle seat post shock absorber 10 comprises a cylindrical seat post plunger 20 inserted into the hollow interior of a tubular sleeve member 30 designed for insertion into the lumen of a tubular frame member of a bicycle 1. A spring member 40 disposed around the seat post plunger 20 functions as a biasing means biases the seat post plunger 20 away from the sleeve member 30. A movement limiting shoulder 12 included on the seat post plunger 20 limits the amount of insertion of said seat post plunger 20 into the sleeve member 30.

The sleeve member 30 is preferably an elongated tube and is for insertion into the lumen of a tubular frame member of a bicycle 1. The sleeve member 30 has a hollow interior 32, upper and lower end openings 34, 36 into the hollow interior, an upper rim 35 at the upper end opening, and a lower rim 37 at the lower end opening.

The seat post plunger 20 is preferably an elongate cylindrical shaft and has a lower insertion portion 21, a middle spring positioning portion 22, and an upper seat mounting portion 23. The lower insertion portion 21 is inserted into the hollow interior 32 of the tubular sleeve member through the upper end opening 34. With reference to FIG. 3, the middle spring positioning portion 22 has a diameter greater than the diameter of the lower insertion portion 21 to form the movement limiting shoulder 12 between the middle spring positioning portion 22 and the lower insertion portion 21. The middle spring positioning portion 22 also has a diameter greater than the diameter of the upper end opening 34 of the tubular sleeve member 30 so that the movement limiting shoulder 12 prevents the insertion of the middle spring positioning portion 22 into the upper end opening 34 of the tubular sleeve member 30.

The upper seat mounting portion 23 having upper and lower ends 24, 25 with the lower end 25 having a diameter greater than the diameter of the middle spring positioning portion 22 to form a spring retaining shoulder 14 between the upper seat mounting portion 23 and the middle spring positioning portion 22. Preferably, as shown in FIG. 3, the upper seat mounting portion 23 is tapered from the lower end 25 towards the upper end 24 to aid in the mounting of a bicycle seat 2 on the upper end 24.

The spring member 40 is disposed around the seat post plunger 20 so that it is positioned between spring retaining shoulder 14 and the upper rim 35 of the tubular sleeve member 30. The spring member 40 biases the upper seat mounting portion 23 away from the upper end opening 34 of the tubular sleeve member.

Preferably, a stop member 50 is coupled to the lower insertion portion 21 of the seat post plunger, ideally by a fastener 52 so that the stop member 50 abuts the lower rim 37 of the tubular sleeve member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat post shock absorbing system, comprising:
 a tubular sleeve member for insertion into the lumen of a tubular frame member of a bicycle, said tubular sleeve member having a hollow interior, upper and lower end openings into said hollow interior, an upper rim at said upper end opening, and a lower rim at said lower end opening;
 a cylindrical seat post plunger having a lower insertion portion, a middle spring positioning portion, and an upper seat mounting portion, said middle spring positioning portion having a diameter greater than the diameter of said lower insertion portion, said middle spring positioning portion having a diameter greater than the diameter of said upper end opening of said tubular sleeve member, said upper seat mounting portion having a diameter greater than the diameter of said middle spring positioning portion;

said seat post plunger lower insertion portion being inserted into said hollow interior of said tubular sleeve member through said upper end opening;

biasing means biasing said upper seat mounting portion away from said upper end opening of said tubular sleeve member;

a spring retaining shoulder being formed between said upper seat mounting portion and said middle spring positioning portion; and a movement limiting shoulder being formed between said middle spring positioning portion and said lower insertion portion, said movement limiting shoulder being for preventing the insertion of said middle spring positioning portion into said upper end opening of said tubular sleeve member.

2. The seat post shock absorbing system of claim 1, wherein said tubular sleeve member and said seat post plunger are elongated.

3. The seat post shock absorbing system of claim 1, wherein said upper seat mounting portion has upper and lower ends, said lower end of said upper seat mounting portion having a diameter greater than the diameter of said middle spring positioning portion, said upper seat mounting portion tapering from said lower end of said upper seat mounting portion towards said upper end of said upper seat mounting portion.

4. The seat post shock absorbing system of claim 1, wherein said biasing means comprises a spring member being disposed around said seat post plunger, said spring member being positioned between said spring retaining shoulder and said upper rim of said tubular sleeve member, said spring member biasing said upper seat mounting portion away from said upper end opening of said tubular sleeve member.

5. The seat post shock absorbing system of claim 1, further comprising a stop member being coupled to said lower insertion portion of said seat post plunger, said stop member abutting said lower rim of said tubular sleeve member.

6. A seat post shock absorbing system, comprising:

an elongate tubular sleeve member for insertion into the lumen of a tubular frame member of a bicycle, said tubular sleeve member having a hollow interior, upper and lower end openings into said hollow interior, an upper rim at said upper end opening, and a lower rim at said lower end opening;

an elongate cylindrical seat post plunger having a lower insertion portion, a middle spring positioning portion, and an upper seat mounting portion, said middle spring positioning portion having a diameter greater than the diameter of said lower insertion portion, said middle spring positioning portion having a diameter greater than the diameter of said upper end opening of said tubular sleeve member, said upper seat mounting portion having upper and lower ends, said lower end of said upper seat mounting portion having a diameter greater than the diameter of said middle spring positioning portion, said upper seat mounting portion tapering from said lower end of said upper seat mounting portion towards said upper end of said upper seat mounting portion;

a spring retaining shoulder being formed between said lower end of said upper seat mounting portion and said middle spring positioning portion;

a movement limiting shoulder being formed between said middle spring positioning portion and said lower insertion portion, said movement limiting shoulder being for preventing the insertion of said middle spring positioning portion into said upper end opening of said tubular sleeve member;

said seat post plunger lower insertion portion being inserted into said hollow interior of said tubular sleeve member through said upper end opening;

a spring member being disposed around said seat post plunger, said spring member being positioned between said spring retaining shoulder and said upper rim of said tubular sleeve member, said spring member biasing said upper seat mounting portion away from said upper end opening of said tubular sleeve member; and a stop member being coupled to said lower insertion portion of said seat post plunger, said top member abutting said lower rim of said tubular sleeve member.

* * * * *